(12) United States Patent
Teti et al.

(10) Patent No.: US 8,542,881 B2
(45) Date of Patent: Sep. 24, 2013

(54) COMPUTER VISION AIDED AUTOMATED TIRE INSPECTION SYSTEM FOR IN-MOTION INSPECTION OF VEHICLE TIRES

(75) Inventors: Fabio Teti, Waxhaw, NC (US); Scott Urban, Charlotte, NC (US); Christopher Austin, Charlotte, NC (US)

(73) Assignee: Nascent Technology, LLC, Charlotte, NC (US)

( * ) Notice: Subject to any disclaimer, the term of this patent is extended or adjusted under 35 U.S.C. 154(b) by 28 days.

(21) Appl. No.: 13/191,085

(22) Filed: Jul. 26, 2011

(65) Prior Publication Data

US 2012/0020526 A1   Jan. 26, 2012

Related U.S. Application Data

(60) Provisional application No. 61/370,311, filed on Aug. 3, 2010, provisional application No. 61/367,698, filed on Jul. 26, 2010.

(51) Int. Cl.
*G06K 9/00* (2006.01)

(52) U.S. Cl.
USPC .......................................... 382/104; 382/141

(58) Field of Classification Search
USPC .................................. 382/104, 141
See application file for complete search history.

(56) References Cited

U.S. PATENT DOCUMENTS

| | | | |
|---|---|---|---|
| 6,961,445 B1 * | 11/2005 | Jensen et al. | 382/103 |
| 2008/0191874 A1 * | 8/2008 | Walker et al. | 340/572.1 |
| 2010/0238290 A1 * | 9/2010 | Riley et al. | 348/148 |
| 2010/0272370 A1 * | 10/2010 | Schilling et al. | 382/199 |

* cited by examiner

*Primary Examiner* — Jon Chang
(74) *Attorney, Agent, or Firm* — Shumaker, Loop & Kendrick, LLP

(57) ABSTRACT

A system and method related thereto, for automatically inspecting at least one tire of a moving vehicle. The system includes an image acquisition device including at least one camera. The camera acquires multiple real-time images of at least one tire of a moving vehicle. As the tire of the vehicle enters a field of view of the camera, the camera component is configured to photograph and transmit the multiple photographs of the at least one tire. A light source illuminates the at least one tire of the vehicle in the field of view of the camera, and the light application may be synchronous with the imaging performed by the camera. A computer image processing component receives the multiple images transmitted from the camera and analyzes the multiple images using a detection program. The computer imaging processing component analyzing the photographs and provides an inspection analysis of each at least one tire.

17 Claims, 8 Drawing Sheets

COMPUTER VISION AIDED AUTOMATED TIRE INSPECTION SYSTEM FOR IN-MOTION INSPECTION OF VEHICLE TIRES

CROSS-REFERENCE TO RELATED APPLICATION

This application claims priority under 35 U.S.C. §119(e) of U.S. Provisional Patent Application Ser. Nos. 61/370,311, filed Aug. 3, 2010, and 61/367,698, filed Jul. 26, 2010, the disclosure of both of which are hereby incorporated by reference in their entirety.

FIELD OF THE INVENTION

The present invention relates to vehicle inspections stations, and more particularly, the present invention relates to vehicle inspection stations which can automatically perform the inspection of a part of a vehicle, e.g. such as a vehicle tire, while the vehicle is in motion.

BACKGROUND OF THE INVENTION

Current inspection of parts of a vehicle for wear and defects is done manually for each vehicle, and by routing the vehicle to an inspection station or location. Typically, inspection of tires may be carried out by manual inspection. For example, at entry or exit to a truck or vehicle cargo loading/unloading zone or secure cargo load drop-off or pick-up installation, such inspections require the trucks to be routed to an inspection station where the vehicle is stopped, to enable manual tire inspection by personnel. This requires labor time and is prone to inspection errors and variation by the person conducting the inspection.

It would therefore be desirable to provide a system and method for inspecting a part of a vehicle, for example, tires on trucks, without rerouting the truck to a designated area, and with minimal labor costs. Moreover, it is desirable to provide a system and method and computer program product for conducting automatic inspection of vehicle tires (e.g., of multi-axle, multi-wheeled cargo trucks) while the vehicle is in motion, Also, there is a need for the vehicle tire inspection process to automatically communicate to a memory storage device of a remote or local computer system and/or an operator inspection results (inspection images, vehicle identification, etc.) for further processing by image processing components to further reduce costs and minimize personnel involved in the inspections.

SUMMARY OF THE INVENTION

In an aspect of the invention, a system for automatically inspecting a tire of a moving vehicle includes a camera component including at least one camera which is configured for acquiring multiple photographs of at least one tire of a moving vehicle. As the part of the vehicle enters a field of view of the camera, the camera component is configured to photograph and transmit the multiple photographs of the vehicle part. A light source illuminates the tire(s) of the vehicle in the field of view of the camera, and the light is applied synchronous with the photographing by the camera. A computer image processing component receives the multiple photographs of the at least one tire transmitted from the camera component. The computer image processing component analyzes the multiple photographs using a detection program. The detection program is stored on a non-transient computer readable medium of a computer system. The computer imaging processing component analyzing the photographs and provides an inspection analysis of the part. The computer image processing component transmits the inspection analysis and the multiple photographs to a customer management system for review.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION OF THE INVENTION

Figure 1:
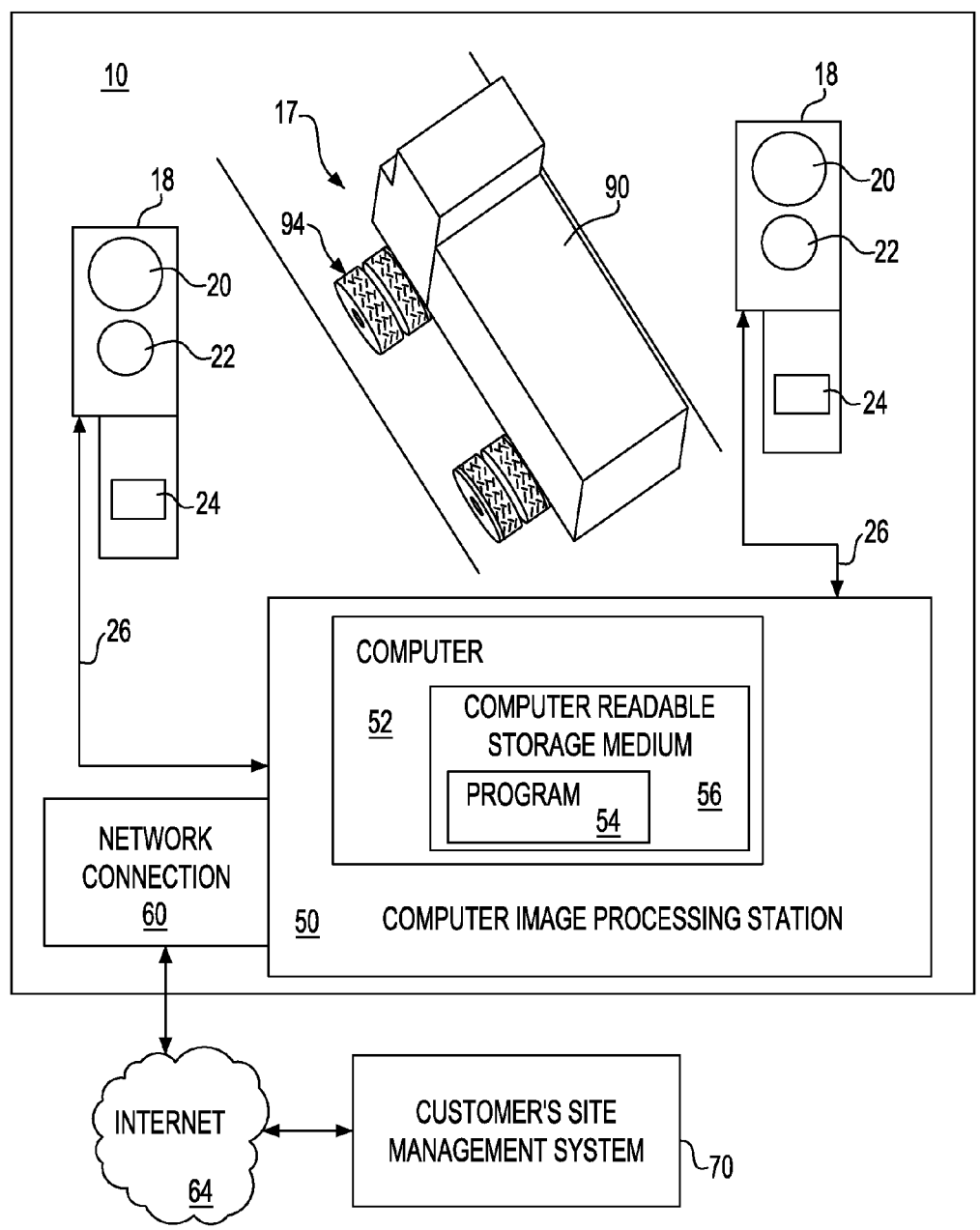
FIG. 1 is a schematic block diagram of a method and system for providing a automated inspection of vehicle tires according to an embodiment of the invention.

Referring to FIGS. 1-4, a system 10 according to an embodiment of the invention generally includes automatically and autonomously inspecting the tires 94 on a vehicle 90, for example, for a commercial single, and tandem axle, dual wheel trailers. The system 10 includes one or more camera devices which may include a high resolution area scan camera 20, and a high-speed velocity camera 22 to photograph or capture real-time high-resolution digital images of tires of an approaching vehicle, and particularly, the treads of the vehicle's tires and sidewalls as they pass through an inspection station or through a vehicle lane 17. The images are processed at high speed to correct for geometric skewing, and then the images are analyzed to determine a tire tread depth as well as presence of any tire sidewall damage, as will be discussed in greater detail below. Results (e.g., acquired images) of the inspection are automatically forwarded, e.g., using wired or wireless communications, to a customer's site management system 70 for analysis, recordation, and/or any other appropriate action to be initiated, such as replacing tires determined defective or not roadworthy by the inspection. The system 10 according to the invention is embodied as described herein and is also referred to as a Tire Inspection System (TIS) 10.

Figure 2:
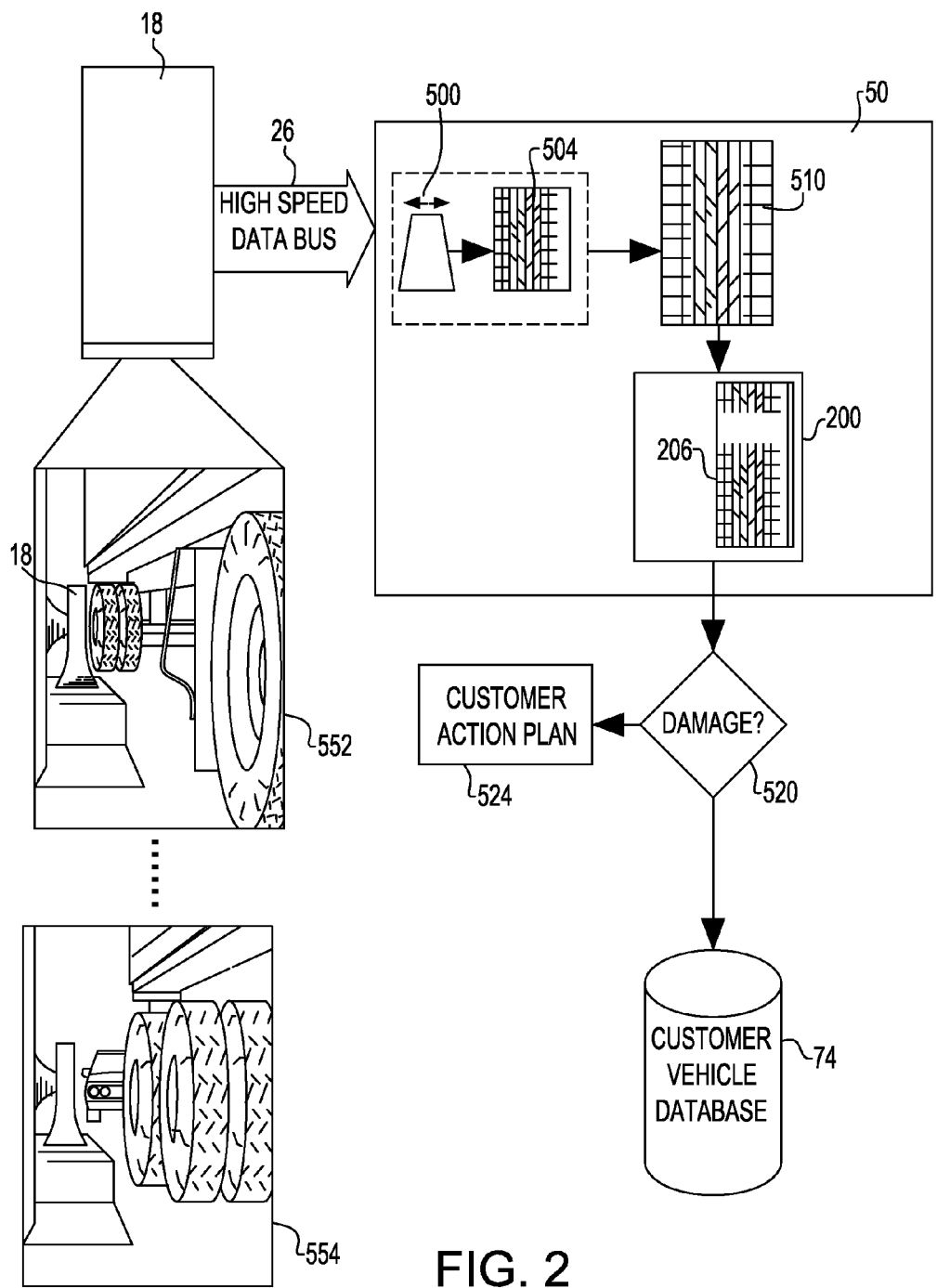
FIG. 2 is a schematic block diagraph of additional aspects of the system shown in FIG. 1.

The TIS 10 may include tire image acquisition cameras 20, 22, and a lighting component including a light source 24 for lighting a vehicle part, such as a tire, at a tire image acquisition station 18, as in the embodiment of the invention shown in FIGS. 1 and 2. The light 24 may also be physically separate from the station 18. Another tire image acquisition station 18 having the same lighting/camera components is positioned on the opposite side of the vehicle as shown in FIG. 1 such that all tires on each side of the approaching vehicle may be simultaneously inspected. A high speed link from the cameras 20, 22 connects to a computer image processing station or component 50. The computer image processing station (IPSt) 50 may include a computer 52 having image processing software or a detection program 54 stored on a non-transient computer readable storage medium 56, such as a hard drive, flash drive, or read only (ROM) or random access (RAM) memory. The TIS 10 further includes a network connection 60, for connecting via a network (for example, the Internet 64), from the IPSt 50 to the customer's site management system 70 (and/or a memory storage device such as a database where relevant).

More particularly, regarding the tire inspection system 10, the cameras 20, 22 may provide a high resolution image at a high frame rate. The quality of the cameras 20, 22 and appropriate use of a light source 24 for lighting the camera image field of view enables the system 10 to accurately detect and record tread depth and damage. The cameras 20, 22 may function with either visible or infrared light, or both. The light 24 may include mounted fixtures, power regulators, and light sources (such as LEDs, halogen, xenon, etc.). The high-speed link 26 connecting cameras 20, 22 to the computer station may include, in one embodiment, a high speed data bus 26 which can be used to connect it to the IPSt 50. The data bus 26 may include Firewire (IEEE-1394), Ethernet over Fiber, GigEthernet over Copper, etc.

In one embodiment of the invention, tire image acquisition cameras 20, 22 include two area scan cameras 20, and optionally, two velocity cameras 22 which are provided for obtaining tire images used for tire inspection processing. The area scan cameras, and one of the velocity cameras are located (mounted or otherwise situated), on each side of the vehicle and included in the tire image acquisitions stations 18.

Figure 3:
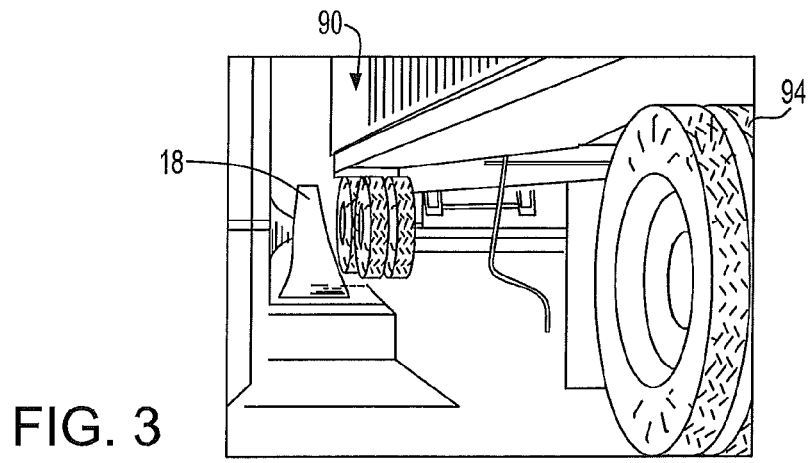
FIG. 3 is a perspective view of a tire image acquisition station and a truck in a vehicle lane.

In operation, the tire image acquisition cameras 20, 22 are pointed toward the tires of an approaching vehicle. For example, in the case of a multi-axle vehicle 90, each camera 20, 22 may be pointed at about a height of approximately 45-50 inches above the roadway. Each of these cameras acquires images of all tires 94 on the respective side of the vehicle within each of its respective field of view. The cameras may be further angled (e.g., at approx. 40-50 degrees) to the vehicle. The cameras 20, 22 are thus configured under programmed operation to acquire images of a tire vehicle tire 94 such as shown in FIG. 3. Further, cameras 20, 22 are configured under programmed operation to acquire images of two tires, e.g., in the case of multiple tires per axle, with the axle including an inner mounted tire 94 and outer mounted tire 95 on the respective same side of vehicle 90 chassis 98 as shown in the example resulting in acquired images shown in FIG. 4. These resulting images are used in the vehicle tire inspection analysis and method described in greater detail hereinbelow. In one non-limiting embodiment, a Basler™ ACE camera with a 640×480 progressive scan CCD sensor, capable of shooting 100 FPS may be implemented as an area scan camera 20.

Figure 4:
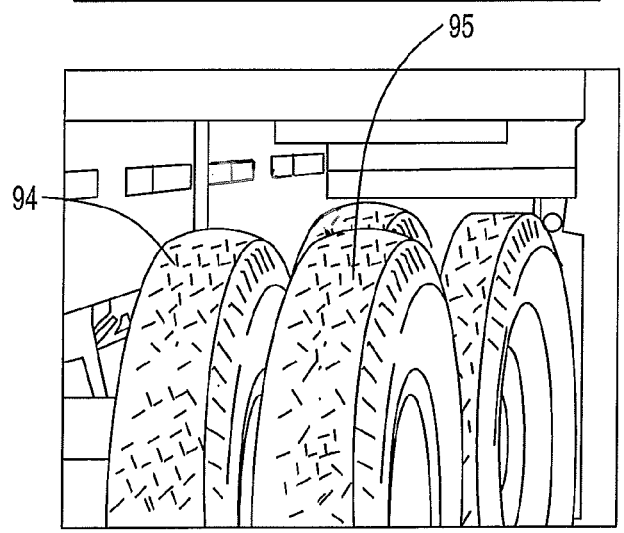
FIG. 4 is an example acquired camera image of dual truck tires including inner and outer tire on a single vehicle side passing the tire acquisition station of FIG. 3.
Figure 5:
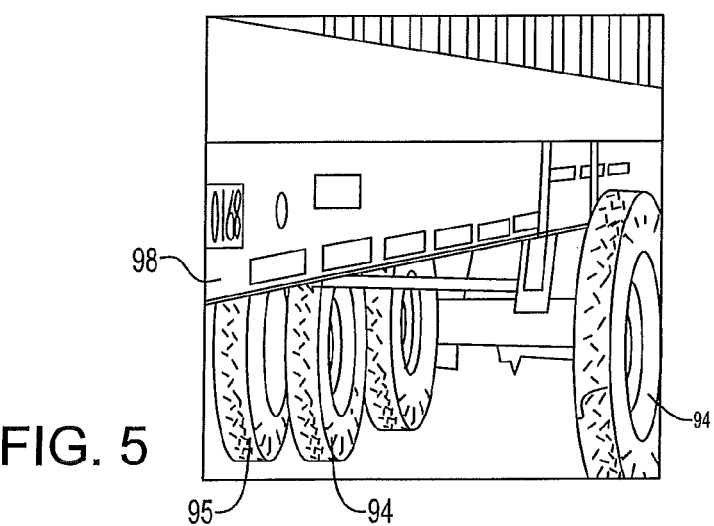
FIG. 5 is a perspective view of a set of truck tires on the opposite side of the truck from those shown in FIG. 4.

With respect to imaging tires of a vehicle having multiple tires per axle, with an axle including an inner mounted tire 94 and outer mounted tire 95 on the respective same side of vehicle chassis 98 as shown in FIG. 4, to ensure that the entire inside tire 95 is imaged (for example, about 12" of tread surface may be visible at any time on the inside tire), a camera image is taken for every foot of vehicle travel. If the vehicle, for example, is traveling at 30 ft/sec (20 MPH), the camera will record 30 images each second (30 FPS). The last 15 images (the amount required to capture one full revolution) may be retained.

Referring to FIG. 2, additional aspects of the system 10 are shown and include two time sequenced images 552, 554 from the tire acquisition station 18 of a vehicle 90 as it travels through the vehicle lane 17 of TIS 10. In one embodiment, the high speed bus 26 is used to transfer the multiple digital images to the computer image processing station 50 which includes an on-line (or off-line) process for removing the skew of the images, using the program 54. As explained in greater detail below referring to FIG. 11, the skew may be caused by the orientation, i.e., viewing angle, of the velocity camera 22. The program runs a geometric algorithm to correct for the skew which enables the skew of the original acquired tire image 500 to be modified, e.g., flattened, for improved observation of the tread in image 504.

In one embodiment, a geometric algorithm used to correct for the image skew is OpenCV—which is an open source Computer Vision library. In particular, the Hough Line transform and Hough Circle Transform is implemented iteratively to locate lines and circles and yield values to correct each image.

Figure 8:
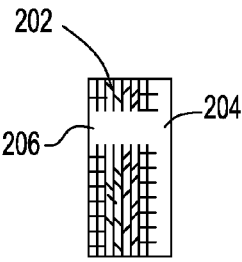
FIG. 8 is a front elevational view of an example tire tread surface and sidewall.

In FIG. 2, the tread photo 510 is analyzed using edge detection algorithms to generate a map of the tire tread or tread map 200 (such as shown in FIG. 8) which depicts the tread wear of the tire. For example, image processing methods within OpenCV can be used to perform the edge detection which, in example embodiments, includes the identification of points within the tire image at which the image brightness varies beyond a preset tolerance. The system 10 further implements a step 520 which inquires whether there is damage to the tire. If there is not damage, the images and data are stored in a customer database 74 of the customer site system 70. If the system 10 detects that the tire has damage in step 520, corrective action may be taken in step 524 by implementing a customer action plan, which may include replacing the defective tire(s).

Figure 6:
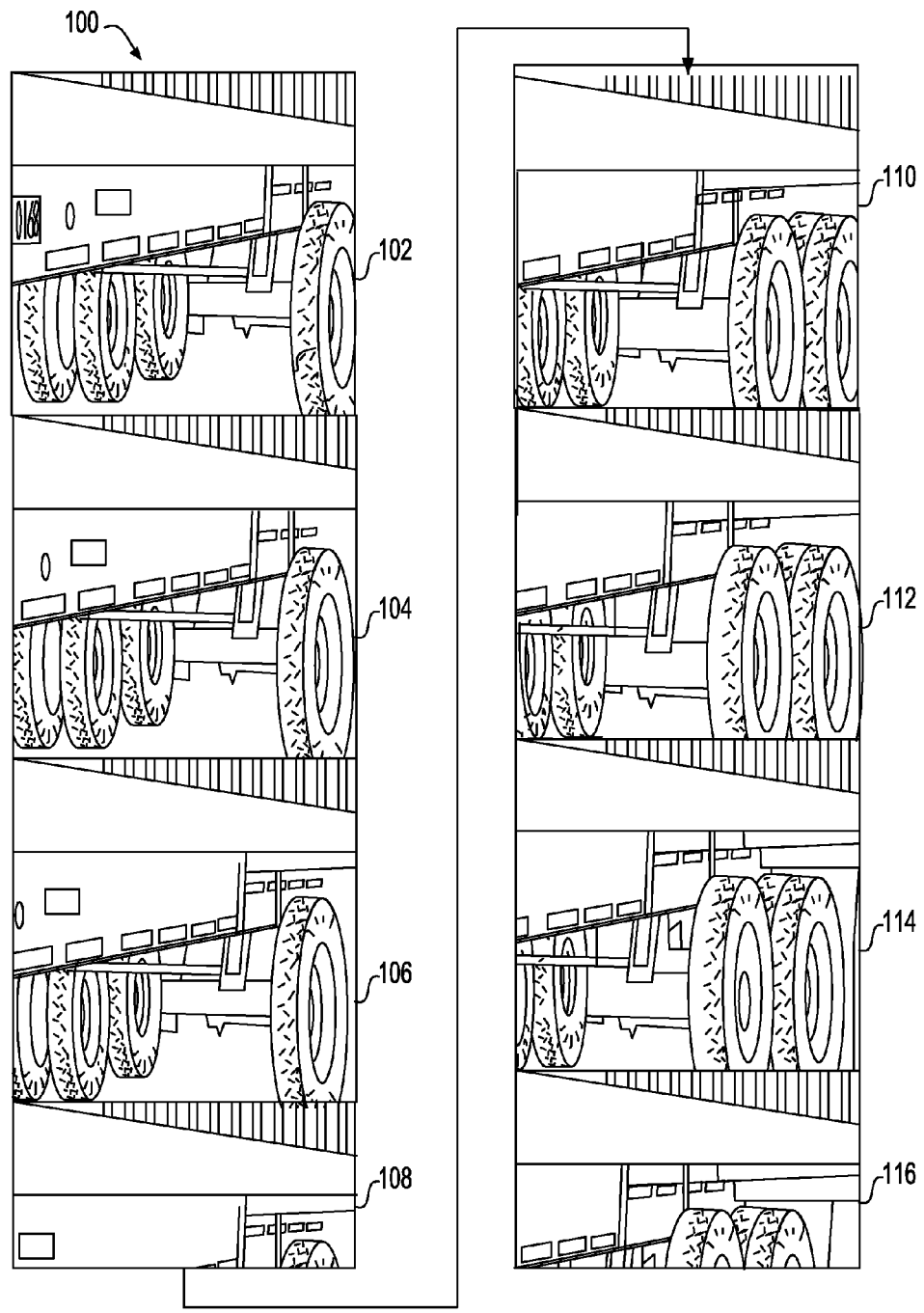
FIGS. 6-7 depict a stitched together time sequence series of acquired camera images of a truck and respective tires traversing one wheel full rotation as the truck passing the tire acquisition station in a vehicle lane.
Figure 7:
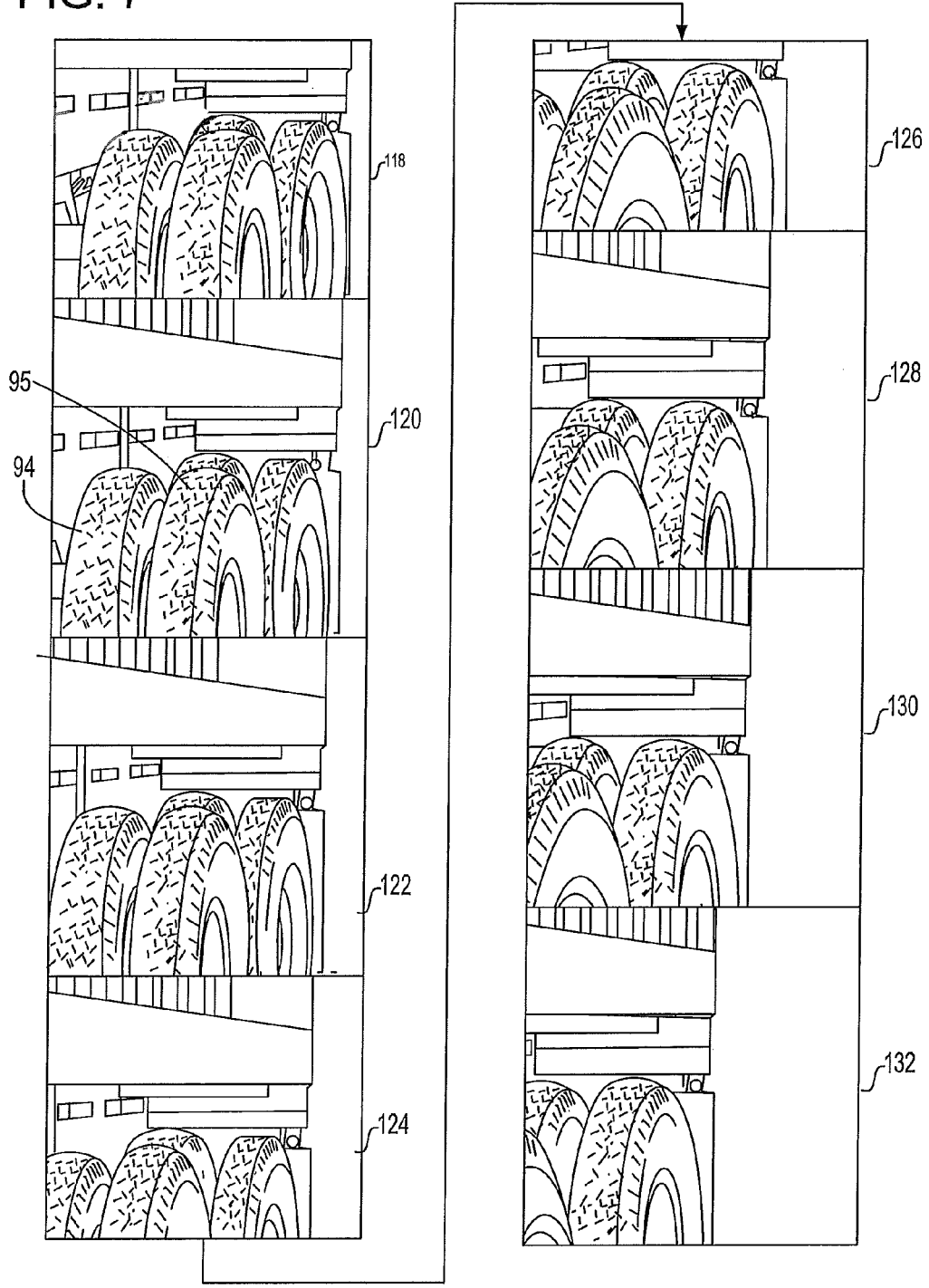

Referring to FIGS. 6 and 7, a continues time sequence series of images 102-132 are shown taken by an image stations 18 on one side of the vehicle. In FIGS. 6 and 7, the camera has simultaneously captured images of a full rotation of both the inner tire 94 and outer tire 95. It is understood that during the acquisition of vehicle tire camera images such as shown in FIGS. 6-7, the field camera's shutter speed adjustments can occur after each image is acquired, during a raw tire image acquisition phase. The velocity camera 22 detects changes in the scene (its field-of-view) to determine the presence of an approaching or passing vehicle. For example, each velocity camera 22 will calculate vehicle velocity based on vehicle/vehicle feature movement across the scene. That is, vehicle velocity is determined by measuring horizontal shifting from one image to the next, using pattern matching. That is, using the edge detection techniques, the system identifies a pattern or interest. Comparing the location of that pattern from multiple images taken at precise times in a known field of view allows for the determination of the velocity of that edge, and therefore of the vehicle. For example, vehicle velocity in one embodiment, is measured by calculating what percentage of the camera's field-of-view has moved in a time period, e.g., 1/15 second. The size of the field of view (as measured in the approaching vehicle lane) is then used for converting to velocity unit, e.g., feet/sec.

The velocity camera 22 further acquires real-time vehicle images for edge detection of the vehicle (e.g., enabling demarcation of a beginning and end of vehicle). Upon determining the vehicle velocity using the computer 50 of the computer image processing station, the appropriate tire image acquisition camera shutter/sampling speed may be set, based on the vehicle's velocity. It is noted that the vehicle velocity may be stored at the image processing station for later storage, e.g., in a database, processing, and/or retrieval. Further, it is understood that the vehicle length may be calculated as an integration of the vehicle velocity (e.g., in feet/sec., noted above) over duration (amount of time the vehicle is in front of the camera).

With respect to the setting of shutter speed based on vehicle velocity determination, the computer system implements an automatic gain and exposure control to adjust for lighting variation, such that, the maximum exposure time (longest) may be limited to some time that will always result in a sharp image (i.e., fast enough to avoid motion blur). In one embodiment, a 1/250 of a second shutter speed is chosen as the maximum (slowest) shutter speed. Shutter speed is calculated based on the duration it takes for the vehicle to move one pixel (e.g., the maximum exposure time to have <1 pixel blur).

The vehicle length, determined based on vehicle edge detection and velocity, may also be stored, e.g., in a database, for later retrieval. In this determination, the system implements a trigger signal to initiate a "start" and "end" of vehicle passage and thus delineate which buffered acquired tire images are to be used for the analysis.

In one embodiment, the area scan camera includes a charge coupled device (CCD) sensor grid of (pixels) that provides a view of an object. Alternatively, with a line scan camera, the CCD scanner includes a single row of pixels. As an object moves through the camera's field of view, a series of pictures are taken (one line at a time). For example, images 102-116 in FIG. 6, and images 118-132 in FIG. 7. These images may then be combined (i.e., "stitched") for analysis (see FIGS. 6, 7 showing a continuous stitched view of single line scan camera output), processing, or human consumption. For example, the stitching of the individual tire images into one image occurs after all of the images have been collected. For example, after the velocity camera 22 has been used to determined where the end of the passage is (vehicle has left/is no longer in the velocity camera's view), the computer image processing station 50 examines the last pre-determined amount, e.g., 12' worth, of captured images (e.g., measured from the end of the vehicle) and determines that the previous 12' of images are applicable. These images are concatenated together for presentation and/or analysis. In one embodiment of the invention, all acquired tire images are stitched together to form a single image such as shown in FIGS. 6-7, frames 102-132. In one example, only images from the last 15' of the vehicle are retained (that includes chassis tire views). That is, although the image acquisition in constant, the specific region of interest for tire images analysis may include the final fifteen feet of the vehicle. So using the edge detection triggers to know the beginning of the vehicle and the end of the vehicle in the sampling area, the system is programmed to retain or analyze only the region known to contain the tire images.

In one embodiment of the system 10, the light 24 may include a lighting system located on each respective side of the vehicle as the light 24 which is shown in FIGS. 1 and 2, however, the lighting system is physically separate from a cameras station. The lighting system, is preferably operated, (e.g., programmed) to illuminate vehicle tires throughout one full revolution, for maximizing exposed tire image capturing. In one example, a pre-defined strip length (e.g., 14' strip) (one tire revolution), horizontally placed in the approaching lane (illuminate tires as they pass) and is located a distance (e.g., 10'), before the cameras 20, 22 (on the approach side).

In one embodiment, the lighting system, is further vertically positioned just above the tire (e.g., approx. 48" from roadway), directing light across the top of the tire, at an angle that does not fill the tread with light. This enhances the differences between tread valleys and outer tire surface, which is that tread valleys are darker than the outer tire surface, thereby assisting in anomaly detection. For example, referring to FIG. 8, a tire 200 includes a tread 202 for meeting with a road surface, and a sidewall 204. When the tire 200 has been skid flat 206, dark valleys in a photograph or image of the tire will not be present.

More specifically regarding the computer image processing station (IPSt) 50, the computer 52 may run an operating system (such as Microsoft Windows™, Ubuntu Linux™ etc.), and the program 54. The program 54 may include proprietary image processing software, or detection software. The IPSt 50 uses a high speed data bus 26 that is compatible with the cameras, 20, 22. The IPSt 50 also includes high speed hardware to handle the processing requirements of the image processing software, and may also include computer readable storage medium 56 which is large capacity, and redundant data storage to provide reliable storing and handling of the image data.

The Image Processing Software (IPSo) or program 54 implements a combination of processing algorithms, as will be described in greater detail below. The program 54 is handles all image processing and data analysis to provide a resulting inspection analysis, and generates a determination of tire health that is presented to the customer's site management system 70 for recordation and/or action.

The information generated by the TIS 10 may also be integrated into the customer's site management system 70 which may include a vehicle database, for alternative uses of the data by the customer. The TIS may include software tools and network connections to allow integration into an existing or new installation.

Figure 9:
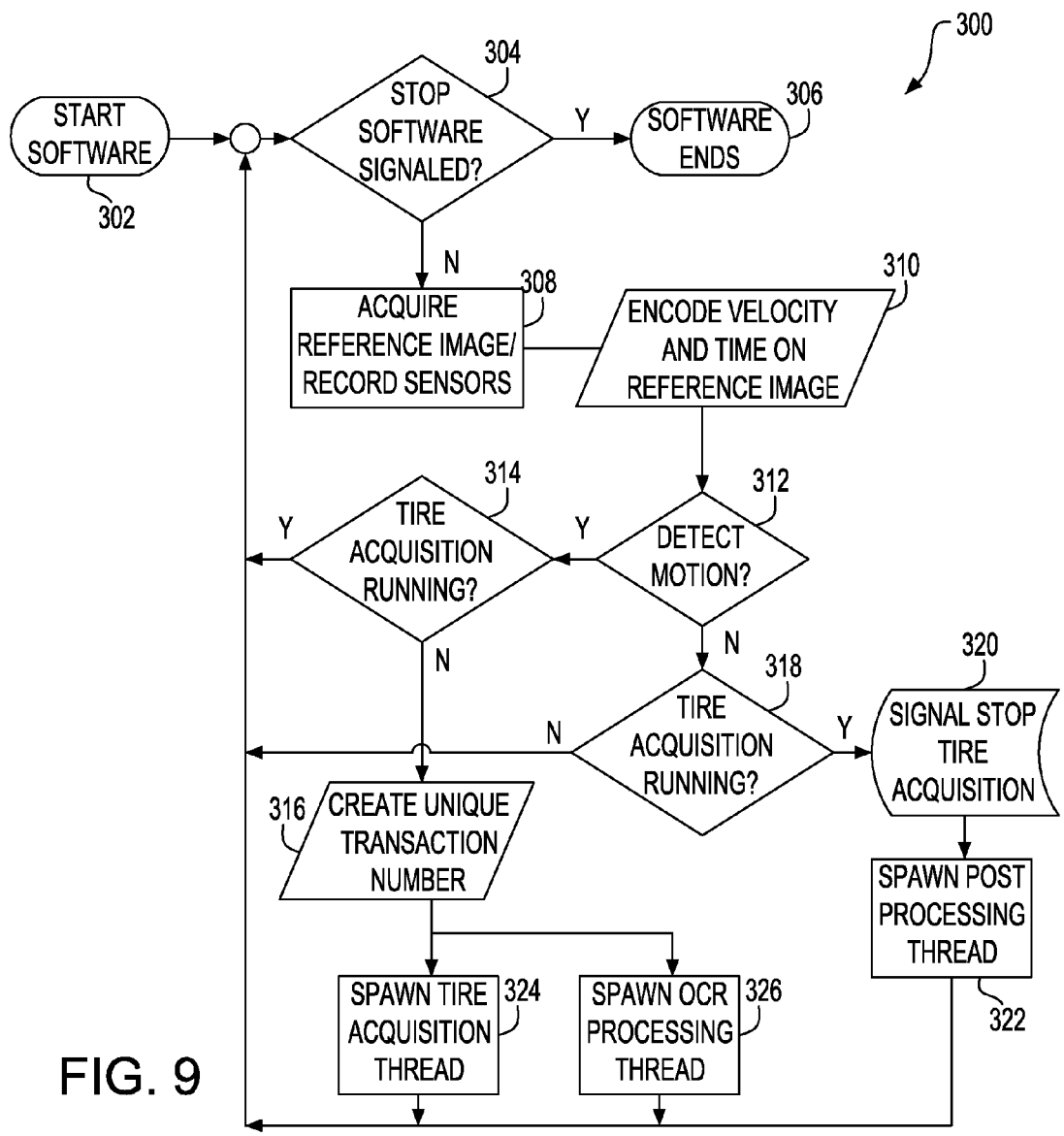
FIG. 9 is a method according to an embodiment of the invention for collecting and analyzing photographic images of a part of a moving vehicle.

Referring to FIG. 9, a method 300 illustrates the detection program 54 process steps implemented in the system 10. The program 54 analyzes a live video (e.g., multiple acquired images) feed (which is supplied by the velocity camera 22). The velocity camera 22 is positioned in a vehicle lane to determine if there is a vehicle in view. The velocity camera 22 also determines the direction of travel of the vehicle, and the speed of the vehicle relative to the last sample. The method 300 includes step 302 for startup of the program 54. Step 304 includes determining whether a stop software signal has been received. If a stop software signal is received, the method 300 proceeds to step 306 and ends the program. If a stop software signal is not received, the process proceeds to step 308 that includes receiving the first image from the velocity camera 22 to create a baseline view of the traffic lane. Each successively received photograph (or also referred to a tire image) transforms the baseline view, such that over 10 seconds the baseline view incorporates the differences in the field of view. The velocity and time is encoded on the reference image in step 310.

Proceeding then to step 312, the method constantly compares the baseline view to the most recent photography frame (also referred to as an image frame) to detect continuous vehicle motion. The program 54 signals motion if a preset percentage of pixels have changed intensity by a preset threshold value. In addition to determining the existence of motion, the method also determines the relative speed of the motion at the time of each image frame. In order to calculate the relative speed, the system accepts parameters defining the field-of-view of the camera/lens components. It is possible to replace the velocity camera 22 with an alternate detection device, such as a speed radar device.

Initiated by the program 54, a predetermined number of tire acquisition threads begin to sample the tires as they travel through the vehicle approach tire inspection lane. Using the cameras 20, 22 and lighting system 24 described above (and described in U.S. Provisional App. No. 61/367,698, which is incorporated by reference in its entirety herein), the TIS 10 captures and digitizes a high resolution image of the tire tread and sidewall, see FIGS. 1 and 2 showing acquisition of a tire image.

The photograph or image may be a continuous stream of data, such as when a line scan camera is used, or discrete images. This image data is transmitted to the IPSo 50 in real time. Each thread records the timestamp of the image data. The system encodes velocity as the vehicle passes for use in the subsequent correction process.

Thereby, if motion is detected in step 312, the method proceeds to step 314 to determine if the tire acquisition software thread is running. If it is not, the method proceeds to step 316 which includes creating a unique transaction number that is assigned to and associated with a vehicle and acquired tire images associated with its inspection each time the detection algorithm detects motion. This transaction number is available to all processes, e.g., spawned parallel processing threads, for the duration of the motion, for example, at step 324 to spawn tire acquisition thread, and at step 326 to spawn OCR (optical character recognition) acquisition thread. When the motion ceases, the transaction is completed. If a tire acquisition is already running in step 314, the program continues by returning to step 304. Returning to step 312, if motion is not detected, the program proceeds to step 318 to determine if tire acquisition is running, and if it is, the method proceeds to step 320 to signal to stop the tire acquisition, and spawn a post processing the thread in step 322. After the Tire Acquisition threads cease, the detection software spawns the thread at 322 to perform post processing of the collected image data. Step 332 includes using the timestamp and speed data encoded on the velocity camera images as a reference, and re-samples the image data collected by the tire acquisition threads. The resultant image is a 2-D representation of the tread as if sampled at a constant velocity.

In a further embodiment, the tire surface may be sampled one line at a time, as a linescan approach. Sample rates may be high as the tire tread will pass at a much faster rate than a vehicle. In one embodiment, shown in FIGS. 1 and 2, the camera may be situated or disposed on sides of the lane and obtain camera images of the tires from an angle. In one embodiment, the camera is placed approximately 36" inches from the lanes edge. To avoid constantly changing focus with a motorized lens, and using a fixed focus, a zoom lens may be used and programmed so as to achieve consistent focus throughout the length of travel, e.g., 12 feet. The greater the distance will give a greater depth-of-field. In one embodiment, approximately 30' between the tire and lens is detected when image sampling begins. Given the 12' of travel, the tire would be 18' from the camera when sampling ends. It is noted that, with the linescan approach, it may be possible to acquire images from the rear of the vehicle, e.g., below a mud flap line, which enables sampling of inner rear tires of in-motion vehicle, for example. Lighting is also sourced from the side of the tire which may help produce shadows to help define tire surface anomalies.

Figure 10:
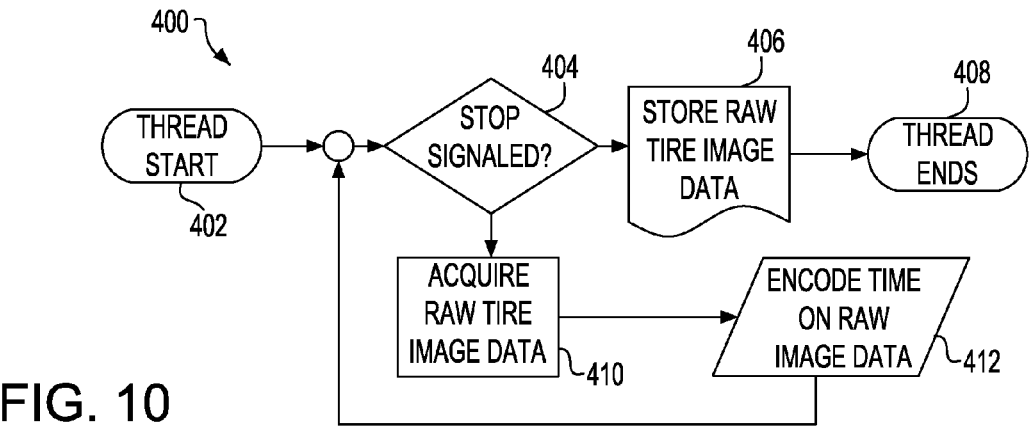
FIG. 10 is a method according to an embodiment of the invention of a subroutine of the method of FIG. 9.

As shown in FIG. 10, a method 400 shows the acquisition process continuing until the detection software signals a completed transaction. A processing thread is stared in step 402. Step 404 determines if a stop is signaled. If yes, the method 400 proceeds to store raw images data, and the thread ends in step 408. If a stop is not signaled in step 404, the method 400 proceeds to step 410 to acquire raw im-motion tire image data, and then to step 412 to encode the time on the raw image data.

Figure 11:
FIG. 11 is a front elevational view of a photograph having skew, and being adjusted or de-skewed for analysis by image processing functions.
Figure 12:
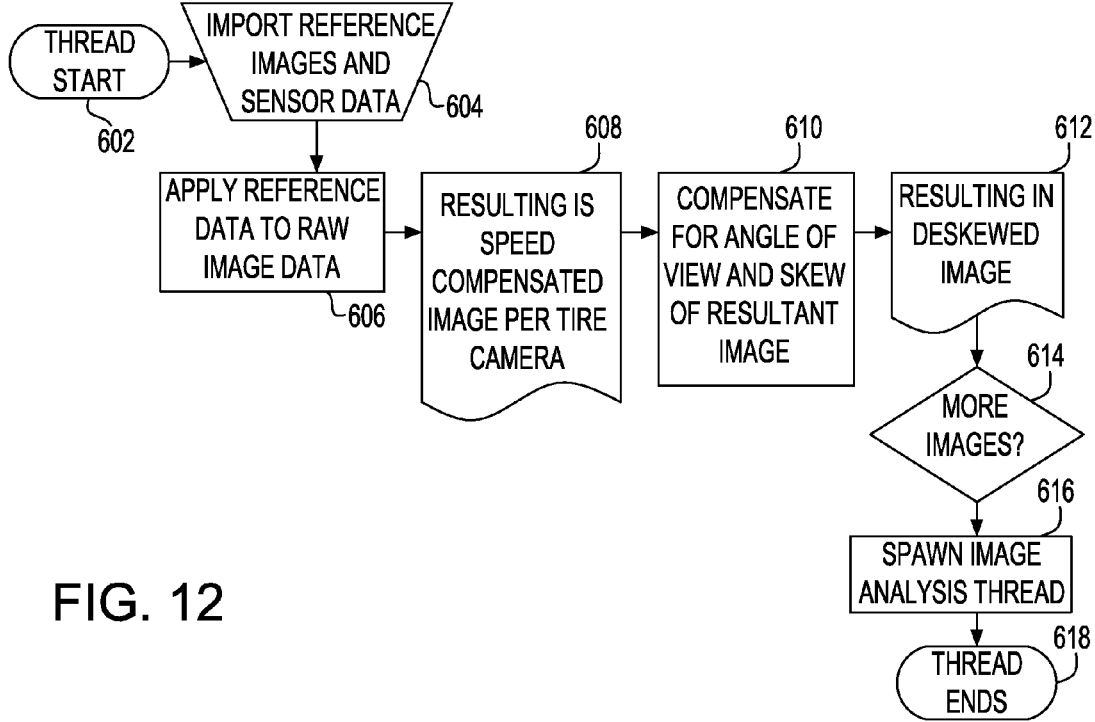
FIG. 12 is a method according to an embodiment of the invention of a subroutine of the method of FIG. 9.

Referring to FIGS. 11-12, due to the angle of the velocity camera 22 relative to the tire 94, and the changing distance from the camera 22 to the tire 94 as it rolls through the inspection station, the 2-D images 500 become skewed (i.e., the tire tread may appear wider at the bottom 502 than at the top 504. That is, because the camera lens is fixed, as the tire gets closer to the camera, the image will widen, resulting in a skewed final photograph. Therefore, by using geometric transforms, the skewed image 500 can be adjusted to remove the skew to result in an adjusted image 510 based on calibration measurements taken during installation of each camera, the skew is removed from each image. Thus the program 54 corrects the skew when post-processing the image and provides a clean, uniform-width image of the tire tread and sidewall (e.g., flattened tire surface) as shown in FIGS. 11 and 2.

Referring to FIG. 12, a method 600 for correcting for skew in the images includes stating the thread in step 602. Step 604 includes importing reference images and sensor data. Step 606 includes applying reference data to raw image data. Step 608 includes generating a speed compensated image per the camera. Step 610 includes compensating for angle of view and skew in image. Step 612 includes providing a de-skewed image. Step 614 ascertains if more images are being received, if not, the method 600 proceeds to step 616 which includes spawning an image analysis thread, and ending the thread in step 618. If it is determined that there are more images in step 614, the method 600 returns to step 606.

Figure 13:
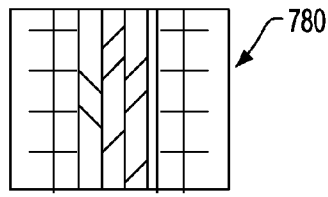
FIG. 13 is a front elevational view of a tire image captured using the system of the present invention.
Figure 14:
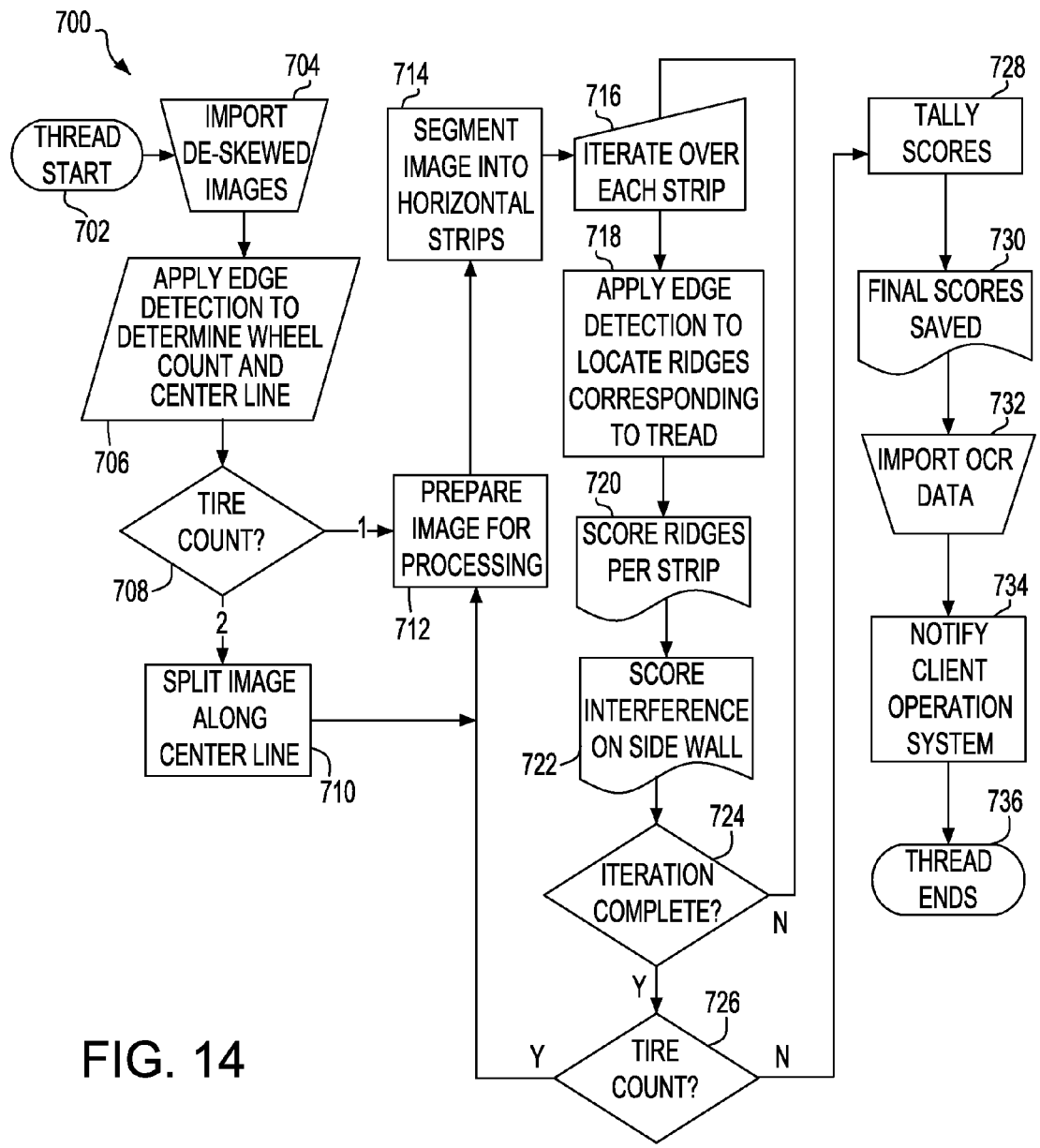
FIG. 14 is a method according to an embodiment of the invention of a subroutine of the method of FIG. 9.

Referring to FIGS. 13 and 14, a method 700 uses standard image processing algorithms, such as the edge detection algorithms provided by image processing methods within OpenCV, for the IPSo computer image processing station 50 to process the corrected image from the post processing thread of method 600 shown in FIG. 12, to define the edges and defects into a non-color, e.g., black and white, image. In a first step 702 the thread of the program 54 is started and proceeds to step 704 to import the de-skewed images. The next step 706 in the analysis is to determine if there are one or two tires in the image (e.g., including inner tire 94, outer tire 95 shown in FIG. 4). Using the non-color image 780, such as shown in FIG. 13, the IPSo 50 looks for a long run of white space with tread patterns on the right or left. If this region is located, it is determined to be the center line between the tires in step 708. At this point, step 710 splits the image into two tire images for subsequent processing at step 712. If it is determined that there is only one tire in step 708, the method 700 proceeds to step 712 to prepare images form processing.

In addition the IPSo counts the number of wheels/axles present, as each wheel in a tandem configuration must be analyzed.

Proceeding then to step 714, there is performed segmenting the images into horizontal strips to use a tread map of the tire to look for skid-flats, sidewall gashes and damage, or other anomalies in, as shown, for example, in FIG. 8. Taking small horizontal samples (e.g., segment strips) that represent the width of the tire tread and sidewall by the height of approximately ½ inch, the IPSo is able to recognize a cross section without tread patterns, indicating a cross section as a skid flat. Thereby, in method 700, each segment strip is iterated in step 716, and then edge detection is applied to locate ridges corresponding to tread in step 718. The ridges are scored per strip in step 720, and interference on the side walls is scored in step 722. Scoring, in the context of the present disclosure, represents the determination and assignment of a value, e.g., a number, representing a degree of tire tread ridge quality, or interference on the tire sidewall, etc. Then, proceeding to step 724, the method includes determining if the iteration of analyzing/scoring segment strips is complete. If it is not, the method 700 returns to step 716 to repeat the edge detection and scoring steps. If the iteration is determined to be complete in step 724 (no more segment strips to process for the current acquired image), the method proceeds to step 726 to determine if more images are being received. If more images are being received, the method 700 returns to step 712 to proceed with preparing the new image for processing and again perform the segmenting and iteration steps of the new image. If, at 726, no more images are being received, the method 700 proceeds to step 728 to tally scores. For example, if two or more successive cross sections indicate a pattern, a skid flat score increases to indicate the likelihood of such a defect. Similarly, the IPSo 50 analyses the edges (or noise) located on the sidewall area which may be more difficult to automate because of the manufacturer's printing on the side wall of the tire.

Then, the method proceeds to step 730 to perform saving of the tallied final scores, e.g., for storage with associated unique transaction number, timestamp, and vehicle ID of the vehicle tires being inspected. Step 732 imports OCR data, and step 734 notifies the client using the customer's management system 70, completing the thread in step 736. For example, using the IPSt's 50 network connection, the TIS 10 notifies the customer's site management system 70 or database of the results of the inspection. Depending on the customer's action plan, damaged tires may be repaired and re-inspected, or simply noted in the database. If so equipped, additional optical character recognition processing cameras, can collect and augment the data feed with the unit number on the target chassis. The resultant data to be sent to the customer's site management system may include: facility name; traffic lane identifier; date/time of inspection; unit number (if OCR is available); number of camera views; number of tires per camera view; skid flat score; image set of tire; potential sidewall damage; and number of axles counted.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A system for automatically inspecting at least one tire of a moving vehicle, comprising:

one or more image acquisition devices including at least one camera device configured for acquiring multiple photographs of at least one tire of a moving vehicle when the at least one tire enters a field of view of the at least one camera device;

a light source for providing light on the at least one tire in the field of view of the at least one camera device, the light being synchronous with the photographing by the at least one camera device; and a computer image processing component for receiving the multiple photographs transmitted from the at least one camera device, the computer image processing component analyzing the multiple photographs using a detection program, the detection program being stored on a non-transitory computer readable medium of a computer system, the computer imaging processing component analyzing the multiple photographs and providing an inspection analysis of the at least one tire, the detection program analyzing the multiple photographs to determine a tread depth of the at least one tire and providing a rating of the at least one tire used to determine when the at least one tire should be replaced, and the computer image processing component transmitting inspection analysis results and the multiple photographs for storage thereof.

2. The system of claim 1, wherein the at least one camera device is activated to begin photographing when the at least one camera device detects movement in the field of view.

3. The system of claim 1, wherein the multiple photographs include a series of photographs of the at least one tire in a specified time sequence.

4. The system of claim 3, wherein the specified time sequence corresponds to each foot of travel of the vehicle.

5. The system of claim 3, wherein the series of photographs taken over the specified time sequence are combined to form a single image.

6. The system of claim 1, wherein vehicle velocity is determined by the at least one camera device and used to adjust a shutter speed of the at least one camera device for capturing photographs of the at least one tire during one revolution of the at least one tire.

7. The system of claim 1, wherein the at least one camera device includes a high resolution area scan camera, and a high-speed velocity camera.

8. The system of claim 1, wherein the at least one camera device provides a live video feed, or series of snapshot digital images, of the at least one tire.

9. The system of claim 1, further comprising at least one camera device on each respective side of the moving vehicle for simultaneously acquiring photographs of tires on both sides of the moving vehicle.

10. The system of claim 9, wherein the photographs include treads of the tires.

11. The system of claim 10, wherein the computer image processing component analyzes tread depth from the photographs of the treads of the tires.

12. The system of claim 1, wherein the at least one camera device further includes:

an area scan camera device that is activated when the moving vehicle enter the field of view of the area scan camera; and a vehicle velocity camera that takes photographs at a specified shutter speed.

13. The system of claim 1, wherein a velocity camera acquires a series of photographs of the at least one tire in a specified time sequence, and the velocity camera measures a speed of the moving vehicle, the specified time sequence corresponding to every foot of travel of the moving vehicle by using an area scan camera that is activated when the moving vehicle enter a field of view of the area scan camera, and the velocity camera takes photographs at a specified shutter speed corresponding to the speed of the moving vehicle.

14. The system of claim 1, wherein the light source includes at least one light for illuminating for the at least one tire during one revolution of the at least one tire, and the light being positioned above the at least one tire.

15. A method for automatically inspecting a tire of a moving vehicle, comprising:
   acquiring multiple images of a tire of a moving vehicle using at least one camera as the tire enters a field of view of the at least one camera;
   illuminating, using a light source, the tire of the vehicle in the field of view of the camera;
   synchronizing the illuminating of the tire and the acquiring multiple images of the tire;
   transmitting the multiple acquired images of the tire to a computer image processing component;
   receiving the multiple acquired images at the computer image processing component;
   analyzing the multiple images of the tire using a detection program to provide a tread depth of the tire and a rating of the tire used to determine when the tire should be replaced, the detection program being stored on a non-transitory computer readable medium of a computer system of the image processing component;
   providing an inspection analysis of the tire using the analysis of the multiple acquired images and the detection program; and
   transmitting the inspection analysis and the multiple acquired images for storage thereof.

16. The method of claim 15, further comprising:
   activating the at least one camera when the camera detects movement in the field of view.

17. A computer program product comprising a non-transitory computer readable medium having recorded thereon a computer program, a computer system including a processor for executing the steps of the computer program for automatically inspecting at least one tire of a moving vehicle, the program steps comprising:
   acquiring multiple images of at least one tire of a moving vehicle using at least one camera, as part of the vehicle enters a field of view of the at least one camera;
   illuminating, using a light source, the at least one tire of the vehicle when in the field of view of the camera;
   synchronizing imaging by the camera with illuminating the at least one tire;
   transmitting the multiple acquired images of the at least one tire to a computer image processing component;
   receiving the multiple acquired images at the computer image processing component;
   analyzing the multiple acquired images of the at least one tire using a detection program, the detection program being stored on a non-transitory computer readable medium of a computer system of the image processing component;
   analyzing the multiple acquired images to determine a tread depth of the at least one tire;
   providing an inspection analysis of the at least one tire using the analysis of the multiple acquired images and the tread depth, and providing a rating of the at least one tire to determine when the at least one tire should be replaced; and
   transmitting the inspection analysis and the multiple acquired images for storage thereof.

* * * * *